United States Patent
Moir et al.

(10) Patent No.: US 7,689,788 B2
(45) Date of Patent: Mar. 30, 2010

(54) SYSTEM AND METHOD FOR EXECUTING TRANSACTIONS

(75) Inventors: Mark S. Moir, Hampton, NH (US); Virendra J. Marathe, Rochester, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 582 days.

(21) Appl. No.: 11/656,843

(22) Filed: Jan. 23, 2007

(65) Prior Publication Data

US 2008/0177959 A1 Jul. 24, 2008

(51) Int. Cl.
*G06F 12/00* (2006.01)
(52) U.S. Cl. ...................................................... 711/154
(58) Field of Classification Search ........................ None
See application file for complete search history.

(56) References Cited

U.S. PATENT DOCUMENTS 5,987,549 A * 11/1999 Hagersten et al. ........... 710/107

6,279,084 B1 * 8/2001 VanDoren et al. ........... 711/141

OTHER PUBLICATIONS

Harris, T. et al.; "Language Support for Lightweight Transactions", OOPSLA 2003, Oct. 26-30, 2003, (15 pages).
Moir, M.; "Hybrid Software/Hardware Transactional Memory"; Sun Microsystems, Inc.; Feb. 13, 2004; (35 pages).

* cited by examiner

*Primary Examiner*—Brian R Peugh
(74) *Attorney, Agent, or Firm*—Osha • Liang LLP (57) ABSTRACT

A method for executing transactions including obtaining a memory location required by a first transaction, where the first transaction is identified using a first transaction identification and a first transaction version; determining a second transaction with ownership of a memory group including the memory location, where the second transaction is identified using a second transaction identification and a second transaction version; copying an intermediate value associated with the memory group from the second transaction into transactional metadata associated with the first transaction; changing ownership of the memory group to the first transaction; and committing the first transaction.

20 Claims, 10 Drawing Sheets

SYSTEM AND METHOD FOR EXECUTING TRANSACTIONS

BACKGROUND

A computer system may execute multiple sequences of instructions concurrently. A sequence of instructions may be provided by a user (e.g., a computer programmer) or by a machine. The concurrent execution of multiple sequences of instructions may be carried out by one or more processors associated with the computer system.

A computer system may have a memory of any size. The memory may be accessible by the multiple sequences of instructions. As the multiple sequences of instructions are executing concurrently, it may be important to prevent one sequence of instructions from observing the partial results of an operation being executed by another sequence of instructions.

Transactional memory allows a sequence of instructions to be defined as a transaction. A transaction is capable of accessing and/or modifying one or more memory locations of the shared memory in a single atomic step. Accordingly, one transaction cannot observe partial results of an operation being executed by another transaction. Transactional memory can be implemented in hardware and/or software.

SUMMARY

In general, in one aspect, the invention relates to a method for executing transactions. The method includes obtaining a memory location required by a first transaction, where the first transaction is identified using a first transaction identification and a first transaction version, determining a second transaction with ownership of a memory group including the memory location, where the second transaction is identified using a second transaction identification and a second transaction version, copying an intermediate value associated with the memory group from the second transaction into transactional metadata associated with the first transaction, changing ownership of the memory group to the first transaction, and committing the first transaction.

In general, in one aspect, the invention relates to a computer readable medium. The computer readable medium stores instructions for executing transactions, the instructions including functionality to obtain a memory location required by a first transaction, where the first transaction is identified using a first transaction identification and a first transaction version, determine a second transaction with ownership of a memory group comprising the memory location, where the second transaction is identified using a second transaction identification and a second transaction version, copy an intermediate value associated with the memory group from the second transaction into transactional metadata associated with the first transaction, change ownership of the memory group to the first transaction, and commit the first transaction.

In general, in one aspect, the invention relates to a system for executing transactions. The systems includes a first transaction comprising transactional metadata associated with a memory location, where the first transaction is identified using a first transaction identification and a first transaction version, a second transaction owning the memory location and comprising an intermediate value associated with the memory location, where the second transaction is identified using a second transaction identification and a second transaction version, and a memory ownership data structure (MODS) comprising a memory group associated with the memory location, where the MODS is modified to change ownership of the memory location to the first transaction prior to committing the first transaction.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for the execution of transactions. In general, embodiments of the system provide a method and system for the execution of transactions using intermediate values and ownership changes associated with memory locations.

Figure 1:
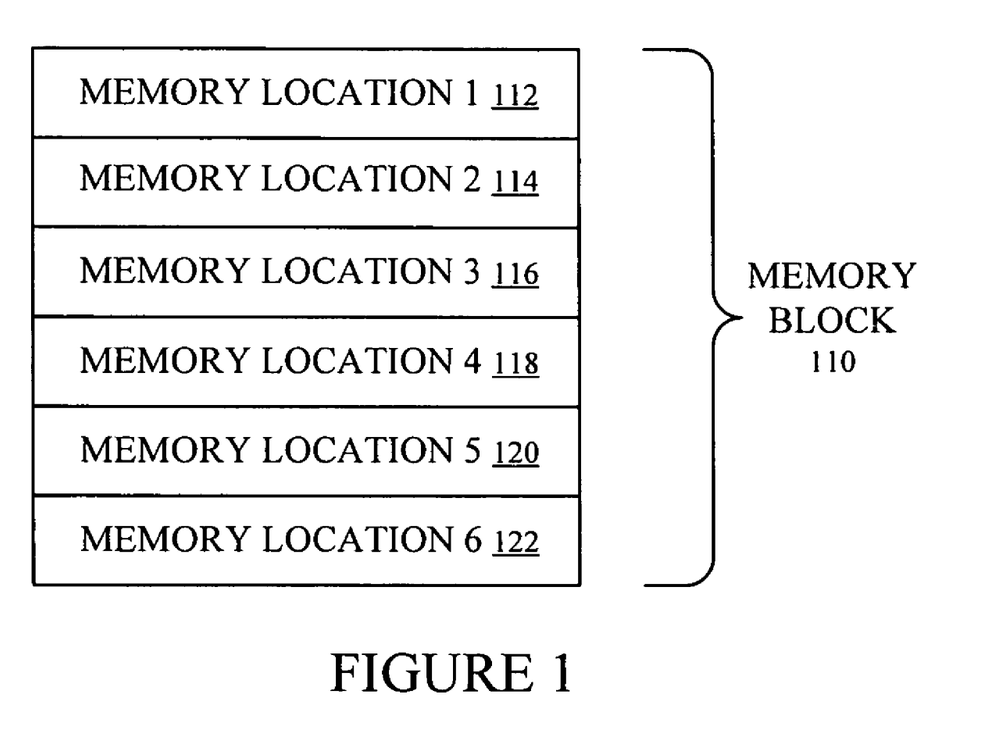
FIG. 1 shows a memory block in accordance with one or more embodiments of the invention.

FIG. 1 shows a block of memory in accordance with one or more embodiments of the invention. Memory Block (110) may belong to the memory of a computing system. As shown in FIG. 1, Memory Block (110) includes multiple memory locations (e.g., Memory Location 1 (112), Memory Location 2 (114), Memory Location 3 (116), Memory Location 4 (118), Memory Location 5 (120), Memory Location 6 (122)). Each memory location is configured to store a value. Further, each memory location is associated with a unique memory address (not shown). The unique memory address may be used to identify the memory location and to access and/or modify the value stored in the memory location. A memory block may have any number of memory locations. Accordingly, this invention should not be limited to a memory block with a specific number of memory locations.

In one or more embodiments of the invention, a memory location belongs to a memory group. Accordingly, a memory group may include one or more memory locations. A memory group may be identified using a memory identifier. In one or more embodiments of the invention, the memory identifier of a memory group is determined by applying a mapping function (e.g., a hash function) to the memory address of any memory location belonging to the memory group.

Consider the following example which is not meant to limit the invention in any way. Memory Location 1 (ML1) (112), Memory Location 2 (ML2) (114), and Memory Location 3 (ML3) (116) may belong to one memory group. The memory identifier (e.g., Memory ID 1) of the memory group may be determined by applying a hash function, H(x), to the memory address of any memory location belonging to the memory group. For example, H(memory address of ML1)=H(memory address of ML2)=H(memory address of ML3)=Memory ID 1.

Similarly, Memory Location 4 (ML4) (118), Memory Location 5 (ML5) (120), and Memory Location 6 (ML6) (122) may belong to one memory group. The memory identifier (e.g., Memory ID 2) of the memory group may be determined by applying a hash function, H(x), to the memory address of any memory location belonging to the memory group. For example, H(memory address of ML4)=H(memory address of ML5)=H(memory address of ML6)=Memory ID 2.

Memory groups may include any number of memory locations, which may or may not be consecutive. Accordingly, this invention should not be limited to a memory group with a specific number or sequence of memory locations.

Figure 2:
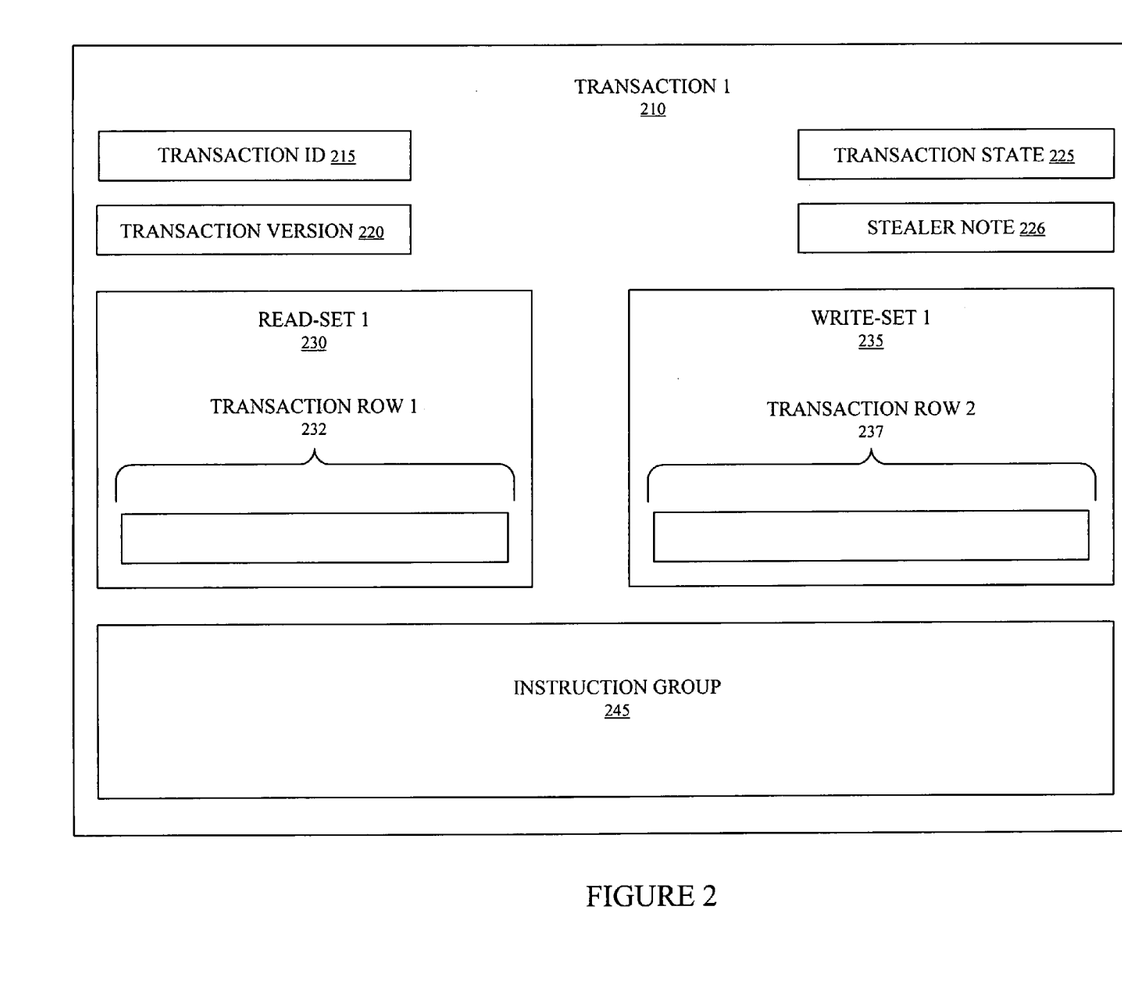
FIG. 2 shows a transaction is accordance with one or more embodiments of the invention.

FIG. 2 shows a transaction in accordance with one or more embodiments of the invention. As shown in FIG. 2, Transaction 1 (210) may include multiple fields (e.g., Transaction ID (215), Transaction Version (220), Transaction State (225), Stealer Note (226)), a group of instructions (e.g., Instruction Group (245)), and multiple memory sets (e.g., Read-Set 1 (230) and Write-Set 1 (235)). Both Read-Set 1 (230) and Write-Set 1 (235) may include one or more transaction rows (e.g., Transaction Row 1 (232), Transaction Row 2 (237)). The multiple fields, the sequence of instructions, and the memory sets are discussed in detail below.

In one or more embodiments of the invention, Transaction ID (215) and Transaction Version (220) are alphanumeric values or numeric values (e.g., integers). Transaction ID (215) and Transaction Version (220), when considered in combination, may uniquely identify Transaction 1 (210). In one or more embodiments of the invention, a first transaction and a second transaction are the same transaction when both the transaction identifier of the first transaction equals the transaction identifier of the second transaction, and the transaction version of the first transaction equals the transaction version of the second transaction.

In one or more embodiments of the invention, Transaction State (225) is an alphanumeric value or a numeric value (e.g., an integer). The value of Transaction State (225) may indicate the current state of Transaction (210) (e.g., ACTIVE, COMMITTED, ABORTED, etc.) (discussed below). In one or more embodiments of the invention, Stealer Note (226) is a pointer to a stealer data structure (e.g., a list) of notes generated by one or more stealer transactions (discussed below).

In one or more embodiments of the invention, Instruction Group (245) is a sequence of instructions to be executed in a single atomic step. Instruction Group (245) may include both read instructions and write instructions. A read instruction and write instruction may access and/or modify a memory location (e.g., Memory Location 1 (112) shown in FIG. 1). In one or more embodiments of the invention, when Instruction Group (245) uses only read instructions (i.e., no write instructions) to access a memory location, Transaction 1 (210) must own the memory location in READ mode prior to executing a read instruction. In one or more embodiments of the invention, when Instruction Group (245) uses at least one write instruction to access and/or modify a memory location, Transaction 1 (210) must own the memory location in WRITE mode prior to executing a write instruction or a read instruction (discussed below).

In one or more embodiments of the invention, for every memory location accessed and/or modified by Transaction 1 (210), at least one of Read-Set 1 (230) and Write-Set 1 (235) stores an entry object (discussed below). When Transaction 1 (210) owns the memory location in READ mode, the entry object may be stored in Read-Set 1 (430). When Transaction 1 (210) owns the memory location in WRITE mode, the entry object may be stored in Write-Set 1 (435).

Figure 3:
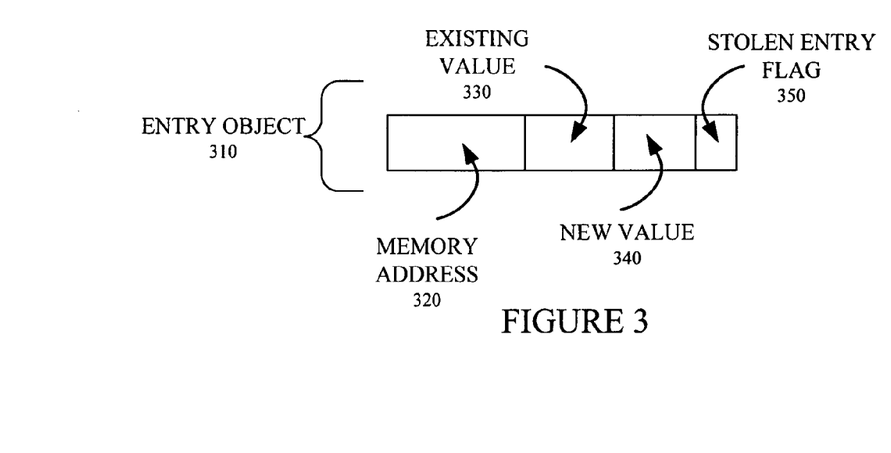
FIG. 3 shows an entry object in accordance with one or more embodiments of the invention.

FIG. 3 shows an entry object in accordance with one or more embodiments of the invention. As shown in FIG. 3, Entry Object (310) includes multiple fields (e.g., Memory Address (320), Existing Value (330), New Value (340), Stolen Entry Flag (350)). Memory Address (320) may be the memory address of the accessed/modified memory location. Existing Value (330) and New Value (340) may be intermediate values associated with the accessed/modified memory location. Stolen Entry Flag (350) may be a boolean value indicating whether ownership of the memory location is stolen from another transaction (discussed below).

Figure 4:
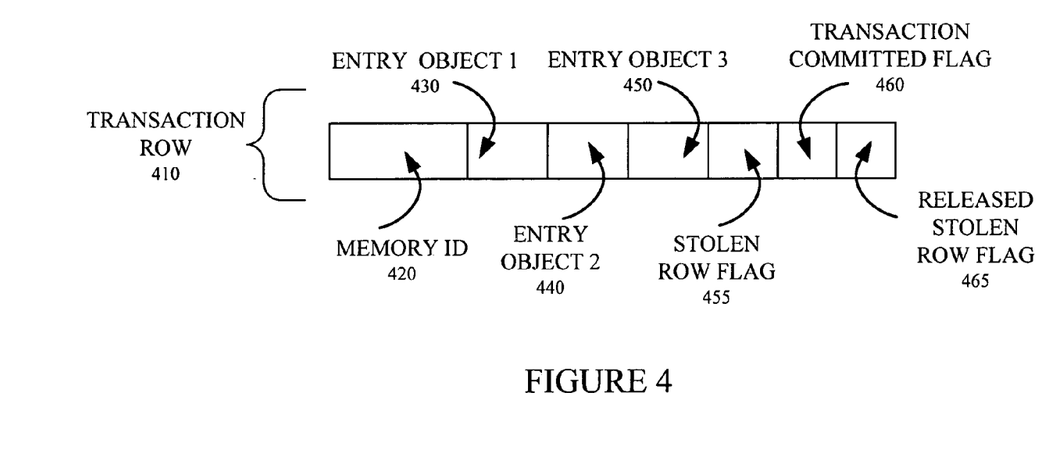
FIG. 4 shows a transaction row in accordance with one or more embodiments of the invention.

Referring back to FIG. 2, in one or more embodiments of the invention, entry objects in Read-Set 1 (230) and/or Write-Set 1 (235) are grouped into transaction rows (e.g., Transaction Row 1 (232), Transaction Row 2 (237)). FIG. 4 shows a transaction row in accordance with one or more embodiments of the invention. As shown in FIG. 4, Transaction Row (410) may include multiple fields (e.g., Memory ID (420), Stolen Row Flag (455), Transaction Committed Flag (460), Released Stolen Row Flag (465)). As also shown in FIG. 4, Transaction Row (410) may include one or more entry objects (e.g., Entry Object 1 (430), Entry Object 2 (440), Entry Object 3 (450)). A transaction row may have any number of entry objects and an entry object may be added to a transaction row it any time.

In one or more embodiments of the invention, all entry objects in a transaction row are associated with memory locations belonging to the same memory group. In other words, the memory location associated with Entry Object 1 (430), the memory location associated with Entry Object 2 (440), and the memory location associated with Entry Object 3 (450) all belong to the same memory group. Memory ID (420) may be the memory identifier of the memory group. In one or more embodiments of the invention, there is only one transaction row in a memory-set (i.e., Read-Set 1 (230), Write-Set 1 (235)) per memory group.

In one or more embodiments of the invention, Stolen Row Flag (455), Transaction Committed Flag (460), and Released Stolen Row Flag (465) are boolean values. The boolean value of Stolen Row Flag (455) may indicate whether at least one entry object in the transaction row is associated with a stolen memory location. The boolean value of Transaction Committed Flag (460) may indicate whether the transaction owning the memory group associated with the transaction row has successfully committed (discussed below). The boolean value of Released Stolen Row Flag (465) may indicate whether the transaction row, if previously stolen, is now available for reuse (discussed below).

Although embodiments of the invention have been described using transaction rows, those skilled in the art, having the benefit of this detailed description, will appreciate transaction rows are only one form of transactional metadata that may be used in the read-set or write-set of a transaction.

In one or more embodiments of the invention, a transaction has exclusive ownership of a memory location before the transaction can access and/or modify the memory location. In one or more embodiments of the invention, a transaction acquires exclusive ownership of all memory locations in a memory group before the transaction can access and/or modify a memory location belonging to the memory group.

Figure 5:
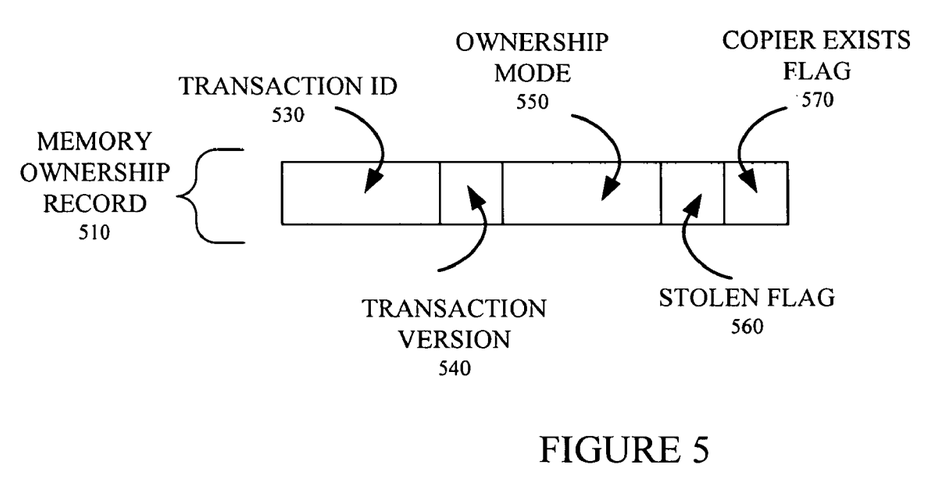
FIG. 5 shows a memory ownership record (MOR) in accordance with one or more embodiments of the invention.

FIG. 5 shows a memory ownership record (MOR) in accordance with one or more embodiments of the invention. A MOR may be used to establish ownership of a memory group (and thus all memory locations belonging to the memory group). As shown in FIG. 5, Memory Ownership Record (510) may include multiple fields (Transaction ID (530), Transaction Version (540), Ownership Mode (550), Stolen Flag (560), Copier Exists Flag (570)). The values of Transaction ID (530) and Transaction Version (540) may be used to identify a transaction. The value of Ownership Mode (550) may be used to identify the mode (e.g., READ, WRITE) in which the transaction owns the memory group. Stolen Flag (560) may be a boolean value used to indicate whether ownership of the memory group has been stolen by the transaction. Copier Exists Flag (570) may be a boolean value identifying whether intermediate values are being copied to one or more memory locations in the memory (discussed below).

In one or more embodiments of the invention, the MOR (510) includes a row offset field (not shown) which identifies the transaction row in the transaction owning the memory group associated with the MOR.

In one or more embodiments of the invention, a MOR may be contained in a memory ownership table (not shown). The memory ownership table may include any number of MORs. In one or more embodiments of the invention, the index of each entry in the memory ownership table is a memory ID of a memory group (discussed above in reference to FIG. 1).

Figure 6:
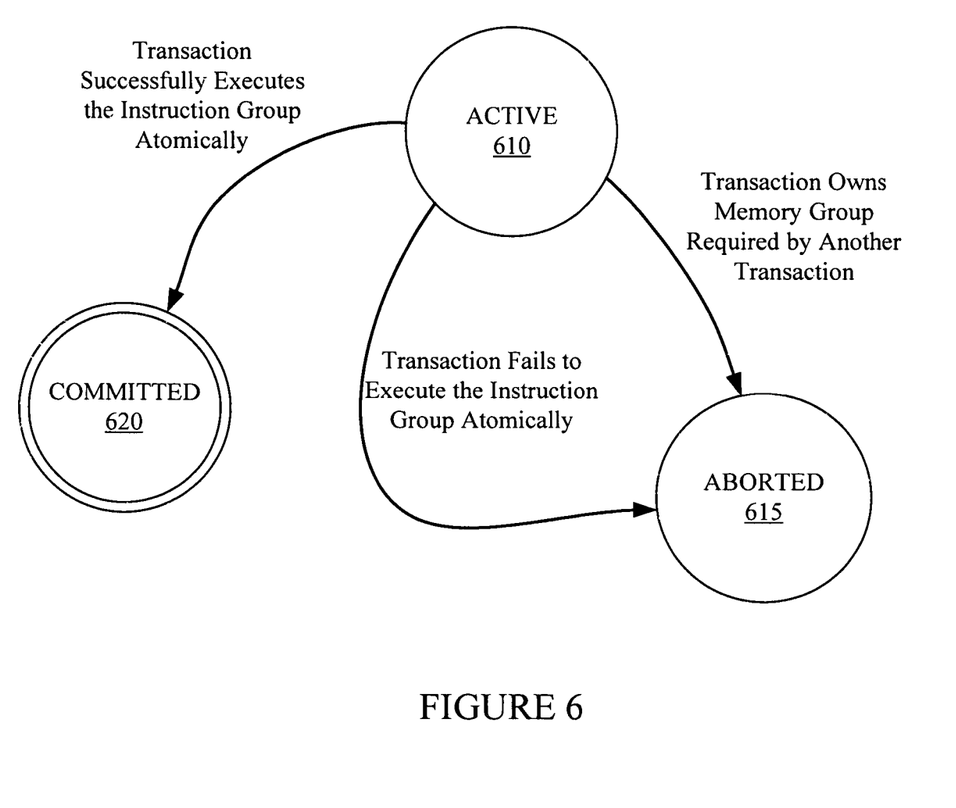
FIG. 6 shows a state diagram in accordance with one or more embodiments of the invention.

FIG. 6 shows a state diagram for transactions in accordance with one or more embodiments of the invention. As shown in FIG. 6, a transaction may be in the ACTIVE state (610), the ABORTED state (615), or the COMMITTED state (620). In one or more embodiment of the invention, the transaction begins execution in the ACTIVE state (610). While in the ACTIVE state (610), the transaction may execute an instruction group. The instruction group may include both read instructions and write instructions.

In one or more embodiments of the invention, prior to executing a read instruction or a write instruction, the transaction acquires ownership of the memory location associated with the read instruction or the write instruction. Those skilled in the art, having the benefit of this detailed description, will appreciate a write instruction may modify a memory location. In one or more embodiments of the invention, the update (i.e., modification) to the memory location is recorded in the write-set of the transaction while the transaction is in the ACTIVE state (610). The memory location itself may not actually be updated until later (discussed below).

In one or more embodiments of the invention, a transaction is transitioned from the ACTIVE state (610) to the ABORTED state (615) when either (i) the transaction fails to execute the instruction group atomically, or (ii) the transaction is aborted by another transaction (discussed below). In one or more embodiments of the invention, a transaction is transitioned to the ABORTED state (615) by changing the state field of the transaction. The state field of the transaction may be changed using a compare-and-swap operation. In one or more embodiments of the invention, any update (i.e., modification) to a memory location prior to the transition to the ABORTED state (615) is discarded. When a transaction is in the ABORTED state (615), the transaction may no longer own any memory groups (and thus may no longer own any memory locations).

In one or more embodiments of the invention, a transaction is transitioned to the COMMITTED state (620) when the transaction completes executing the instruction group. Once in the COMMITTED state (620), the transaction may copy back the updates recorded in the write-set to the one or more memory locations. Ownership of the memory locations may be released when the copyback process is complete. In other words, after a transaction is transitioned to the COMMITTED state (620), a memory location may either be (i) in the process of being updated, or (ii) updated. Thus, when a transaction atomically commits (i.e., transitions from the ACTIVE state (610) to the COMMITTED state (620) in a single atomic step), all the memory locations owned by the transaction may be deemed atomically updated. In one or more embodiments of the invention, ownership of all memory locations owned by a transaction may be relinquished by changing (e.g., incrementing) the version of the transaction (e.g., Transaction Version (220) discussed above in reference to FIG. 2).

As discussed above, a copyback process updates (i.e., modifies) a memory location based on the contents of the write-set associated with the transaction. As also discussed above, a write-set may be organized into transaction rows. In one or more embodiments of the invention, the copyback process is executed on a transaction row-by-transaction row basis. In other words, an attempt is made to copy back all the values in one transaction row before proceeding to the next transaction row. As discussed above, each transaction row may be associated with a memory group. Ownership of a memory group may be released once the copy back process has successfully copied back all the values in the transaction row associated with the memory group.

In one or more embodiments of the invention, when the stolen row flag of a transaction row is set to "true", the copyback process does not update the memory locations associated with the transaction row. Instead, the copyback process may set the transaction committed flag of the transaction row to "true" and proceed to the next transaction row.

Although embodiments of the invention have been described with respect to write instructions, those skilled in the art, having the benefit of this detailed description, will appreciate that a transaction owning a memory location in READ mode (i.e., a transaction having only read instructions for accessing the memory location) does not execute a copyback process when transitioned to the COMMITTED state (620). In one or more embodiments of the invention, a transaction owning a memory location in READ mode releases ownership of the memory location once transitioned to the COMMITTED state (620).

Figure 7:
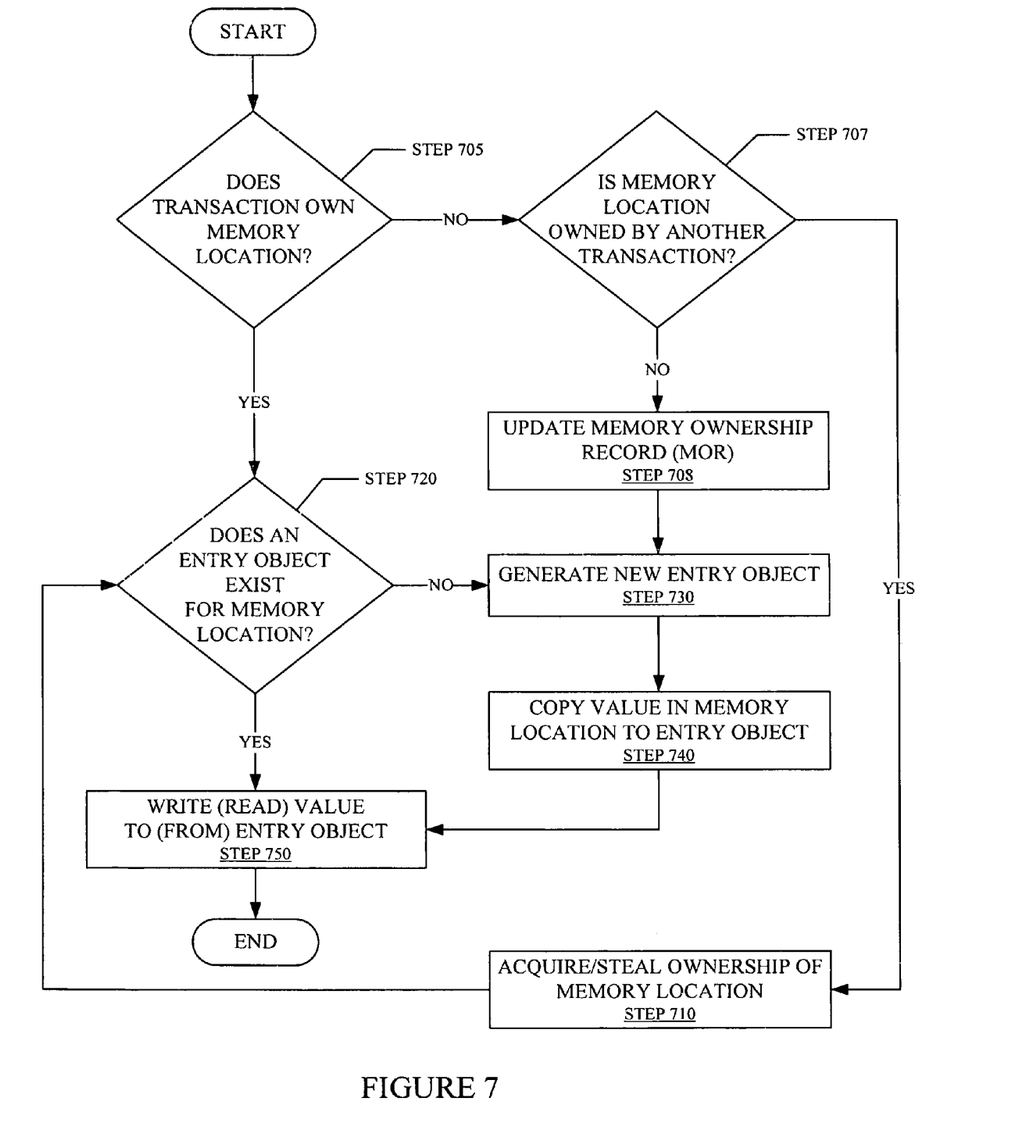
FIGS. 7-9 show flowcharts in accordance with one or more embodiments of the invention.

FIG. 7 shows the process of executing either a read instruction or a write instruction associated with a transaction in accordance with one or more embodiments of the invention. Initially, a determination is made whether the memory location associated with the read instruction or write instruction is currently owned by the transaction (STEP 705). In one or more embodiments of the invention, in order to own a memory location, a transaction must own the memory group to which the memory location belongs. Ownership of a memory group may be determined by examining memory ownership records (MORs) (e.g., Memory Ownership Record (510) shown in FIG. 5). When a determination is made that the transaction currently owns the memory group to which the memory location belongs, the process proceeds to STEP 720.

In STEP 720, a determination is made whether the transaction already has an entry object associated with the memory location to be accessed by the read instruction or modified by the write instruction. In one or more embodiments of the invention, the existence of an entry object is determined by examining the transaction row associated with the memory group to which the memory location belongs. When the entry object associated with the memory location already exists, the transaction reads from (or writes to) the entry object depending on the type of instruction (STEP 750).

Still referring to STEP 750, in one or more embodiment of the invention, when the instruction is a read instruction, the transaction reads from the existing value of the existing entry object (e.g., Existing Value (330) shown in FIG. 3). In one or more embodiments of the invention, when the instruction is a write instruction, the transaction writes to the new value of the existing entry object (e.g., New Value (340) shown in FIG. 3).

Referring back to STEP 720, when a determination is made that the transaction does not have an entry object for the memory location, a new entry object may be generated (STEP 730). In one or more embodiments of the invention, generating a new entry object includes inserting the new entry object into the appropriate transaction row of the transaction, setting the memory address field of the new entry object to the address of the memory location, and setting the stolen entry flag of the new entry object to "false."

In one or more embodiments of the invention, when the transaction does not have a transaction row associated with the memory group, a new transaction row is initialized (not shown). Initializing a new transaction row may include inserting the new transaction row into a memory-set of the transaction. Initializing the new transaction row may also include setting the memory ID field of the transaction row to the memory ID of the memory group to which the memory location belongs. Initializing the new transaction row may further include setting the stolen row flag, the transaction committed flag, and the released stolen row flag to "false."

In one or more embodiments of the invention, transaction rows are reused. Accordingly, when a transaction row must be initialized (e.g., as part of STEP 730), an existing transaction row may be used providing both (i) the stolen flag of the existing transaction row is "true" and (ii) the released stolen row flag of the existing transaction row is "true" (discussed below).

In STEP 740, the value stored in the memory location may be copied to the newly created entry object. In one or more embodiments of the invention, when the transaction owns the memory location in READ mode, the value from the memory location is copied to the existing value (e.g., Existing Value (330) shown in FIG. 3) of the newly created entry object. In one or more embodiments of the invention, when the transaction owns the memory location in WRITE mode, the value from the memory location is copied to the new value (e.g., New Value (340) shown in FIG. 3) of the newly created entry object. The process may then proceed to STEP 750 (already discussed above).

Referring back to STEP 705, when a determination is made the memory location is not currently owned by the transaction, the process proceeds to STEP 707. In STEP 707, a determination is made whether the memory location is currently owned by another transaction. As discussed above, a transaction may own a memory location by owning the memory group to which the memory location belongs. Ownership of a memory group may be determined by examining one or more MORs. When it is determined the memory group to which the memory location belongs is not owned by another transaction, the transaction may acquire ownership of the memory group (and thus ownership of the memory location) by updating the MOR associated with the memory group (e.g., using a compare and swap (CAS) or similar operation) (STEP 708).

In one or more embodiments of the invention, updating the MOR includes setting the transaction ID field and the transaction version field to values associated with the transaction (e.g., Transaction ID (215) and Transaction Version (220) as shown in FIG. 2). Updating the MOR may further include setting both the stolen flag and copier exists flag of the MOR to "false." As discussed above, a MOR may include an offset row field. The offset row field may identify the transaction row of the transaction which owns the memory group associated with the MOR. Once ownership of the memory group (and thus the memory location) has been acquired by the transaction, the process proceeds to STEP 730 (already discussed above).

Referring back to STEP 707, when a determination is made that the memory location is currently owned by another transaction (i.e., a MOR associated with the appropriate memory group contains the transaction ID and the current transaction version of an ACTIVE or COMMITTED transaction), ownership of the memory location may be changed to the present transaction by either (i) aborting the other transaction, if the other transaction is ACTIVE, and acquiring the ownership of the newly unowned memory location, or (ii) stealing ownership of the memory group from the other transaction, if the other transaction is COMMITTED. In one or more embodiments of the invention, a delay is taken before an attempt is made to steal a memory location or abort the other transaction. The delay may provide sufficient time for the current owner of the memory location to relinquish ownership, and thus obviate the need to steal the memory location or abort the other transaction. In one or more embodiments of the invention, a transaction steals ownership of a memory location by stealing ownership of the memory group to which the memory location belongs. When the memory group (and thus the memory location) is successfully acquired or stolen, the process may proceed to STEP 750 (already discussed above).

Figure 8:
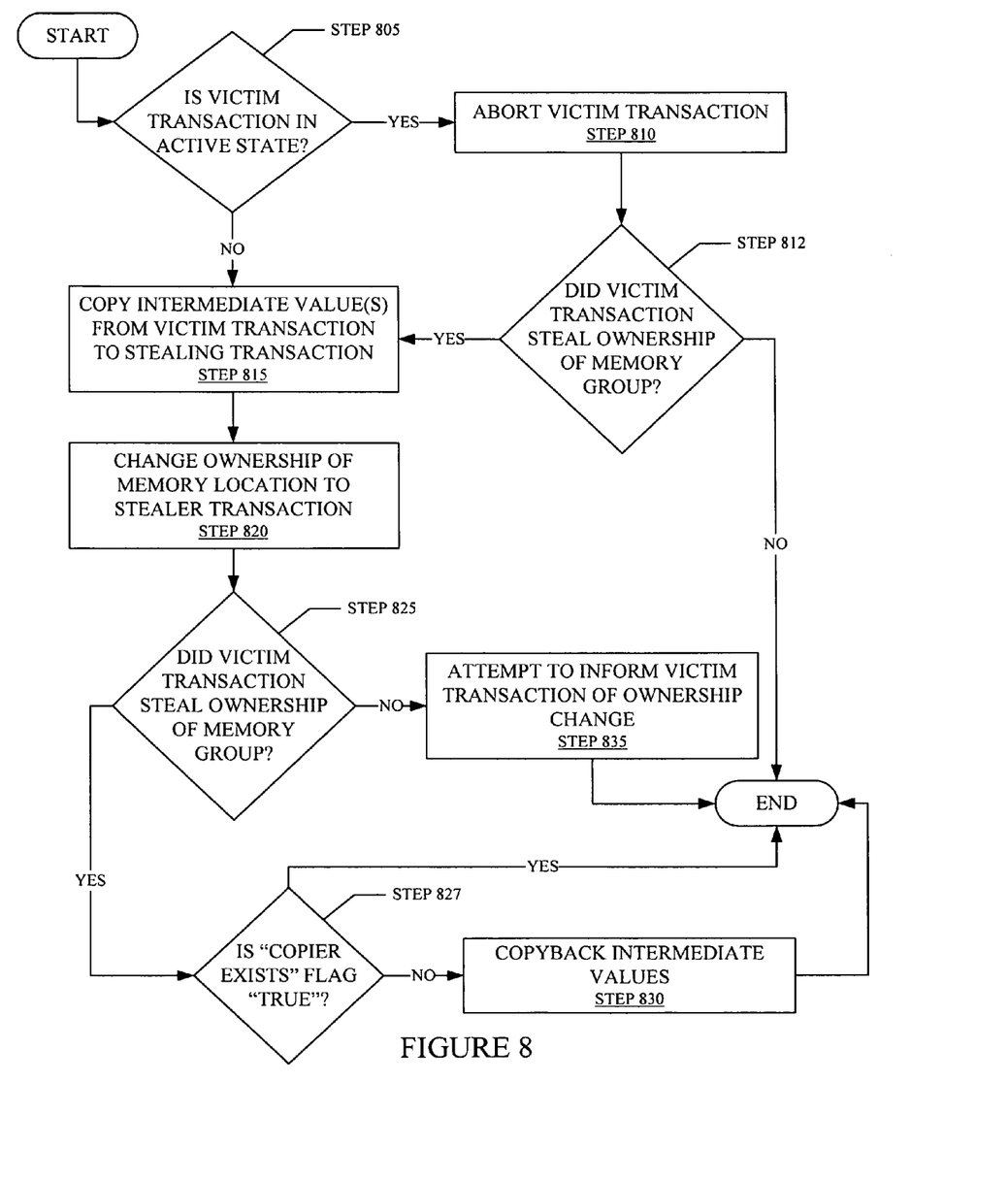

FIG. 8 shows a process for stealing a memory location in accordance with one or more embodiments of the invention. As discussed above, a transaction may own a memory location by owning the memory group to which the memory location belongs. Accordingly, in order to steal a memory location, the stealer transaction must steal ownership of the memory group to which the memory location belongs.

Initially, a determination is made whether the transaction that currently owns the memory location (i.e., the victim transaction) is in the ACTIVE state (STEP 805). When the victim transaction is in the ACTIVE state, the victim transaction may be ABORTED (STEP 810). As discussed above, aborting a victim transaction may include changing the state field of the victim transaction to ABORTED using a compare-and-swap operation. Once a victim transaction has been aborted (STEP 810), or once it is determined the victim transaction is in the COMMITTED state, the process may proceed to STEP 815.

In STEP 812, a determination is made whether the victim transaction itself has stolen ownership of the memory group. In other words, it is determined whether the victim transaction was previously a stealer transaction of the memory group. In one or more embodiments of the invention, the victim transaction was previously a stealer transaction when the stolen flag of the MOR associated with the memory group was set to "true" prior to changing ownership.

In one or more embodiments of the invention, when it is determined the victim transaction did not steal the memory group, the memory group is considered unowned. There is no longer a need to steal the memory location and the process ends. Ownership of the unowned memory group (and thus memory location) may be acquired as shown in STEPS 708, 730, 740, and 750 discussed above in reference to FIG. 7. When it is determined the victim transaction did steal the memory group, the process proceeds to STEP 815.

In STEP 815, intermediate values associated with the memory group may be copied from the victim transaction to the stealer transaction. Intermediate values may be copied to new entry objects in a transaction row of the stealer transaction. Copying the intermediate values is discussed below in reference to FIG. 9).

In STEP 820, ownership of the memory location may be changed from the victim transaction to the stealer transaction. In one or more embodiments of the invention, changing ownership of the memory location is accomplished by changing ownership of the memory group to which the memory location belongs. Changing ownership of the memory group may include changing one or more fields of the MOR associated with the memory group. The transaction identifier field, the transaction version field, and the transaction state field of the MOR may be changed (e.g., using a compare-and-swap operation) to set the stealer transaction as the new owner of the memory location. In one or more embodiments of the invention, changing the ownership of the memory group (and thus ownership of the memory location) includes setting both the stolen flag and the copier exists flag of the MOR to "true."

In STEP 825, a determination is made whether the victim transaction itself has stolen ownership of the memory group. In other words, a determination is made whether the victim transaction was previously a stealer transaction of the memory group. STEP 825 is essentially the same as STEP 812 (discussed above). In one or more embodiments of the invention, the victim transaction was previously a stealer transaction when the stolen flag of the MOR associated with the memory group was set to "true" prior to changing ownership.

In one or more embodiments of the invention, when a determination is made that the victim transaction did not steal the memory group, the present stealer transaction attempts to inform the victim transaction that ownership of the memory group has been stolen (STEP 835). Informing the victim transaction that the memory group has been stolen may include making an entry (e.g., inserting a note) in a stealer data structure pointed to by the stealer note field (e.g., Stealer Note (226)) of the victim transaction. In one or more embodiments of the invention, when the COMMITTED victim transaction has completed copyback to all locations in the memory group, the entry in the stealer data structure triggers the victim transaction to reset the copier exists flag of the MOR associated with the memory group to "false."

In one or more embodiments of the invention, when the COMMITTED victim transaction completes the copyback process before the stealer transaction informs the victim transaction of the memory group ownership change, the attempt to inform the victim transaction fails. In such embodiments, the stealer transaction resets the copier exists flag of the MOR associated with the memory group to "false," and resets the stolen flag of the MOR to "false" provided the memory location has not been restolen in the meantime.

Still referring to STEP 825, when it is determined that the victim transaction was previously a stealer transaction of the memory group, the process may proceed to STEP 827. In STEP 827, a determination is made whether the copier exists flag of the MOR was set to "true" just prior to stealing. When it is determined that the copier exists flag of the MOR was set to "true" just prior to stealing, the process ends. However, when it is determined that the copier exists flag of the MOR was set to "false" just prior to stealing, the current stealer transaction executes a copyback of the intermediate values of STEP 815 (STEP 830). STEP 830 is essentially the same as the copyback process described above in reference to FIG. 6. However, the copyback process of STEP 830 is executed by the stealer transaction in the ACTIVE state and only intermediate values copied from the victim transaction are included in the copyback process.

In one or more embodiments of the invention, when the intermediate values successfully update the memory locations of the memory group (i.e., the copyback process is successful), the stolen flag field of the MOR, the stolen row flag of the transaction row associated with the memory group in the stealer transaction, and the stolen entry flags of the entry objects in the transaction row (discussed below) are set to "false." In other words, when the copyback process of STEP 830 is successful, the memory group (and thus all memory locations belonging to the memory group) may be reset as non-stolen. If the memory group has been restolen in the meantime, the stolen flag field of the MOR is not reset to "false."

In one or more embodiments of the invention, the released stolen row flag of the transaction row associated with the victim transaction is set to "true" when the victim transaction is identified as a stealer transaction. In such embodiments, the transaction row in the victim transaction can now be reused (discussed above).

Figure 9:
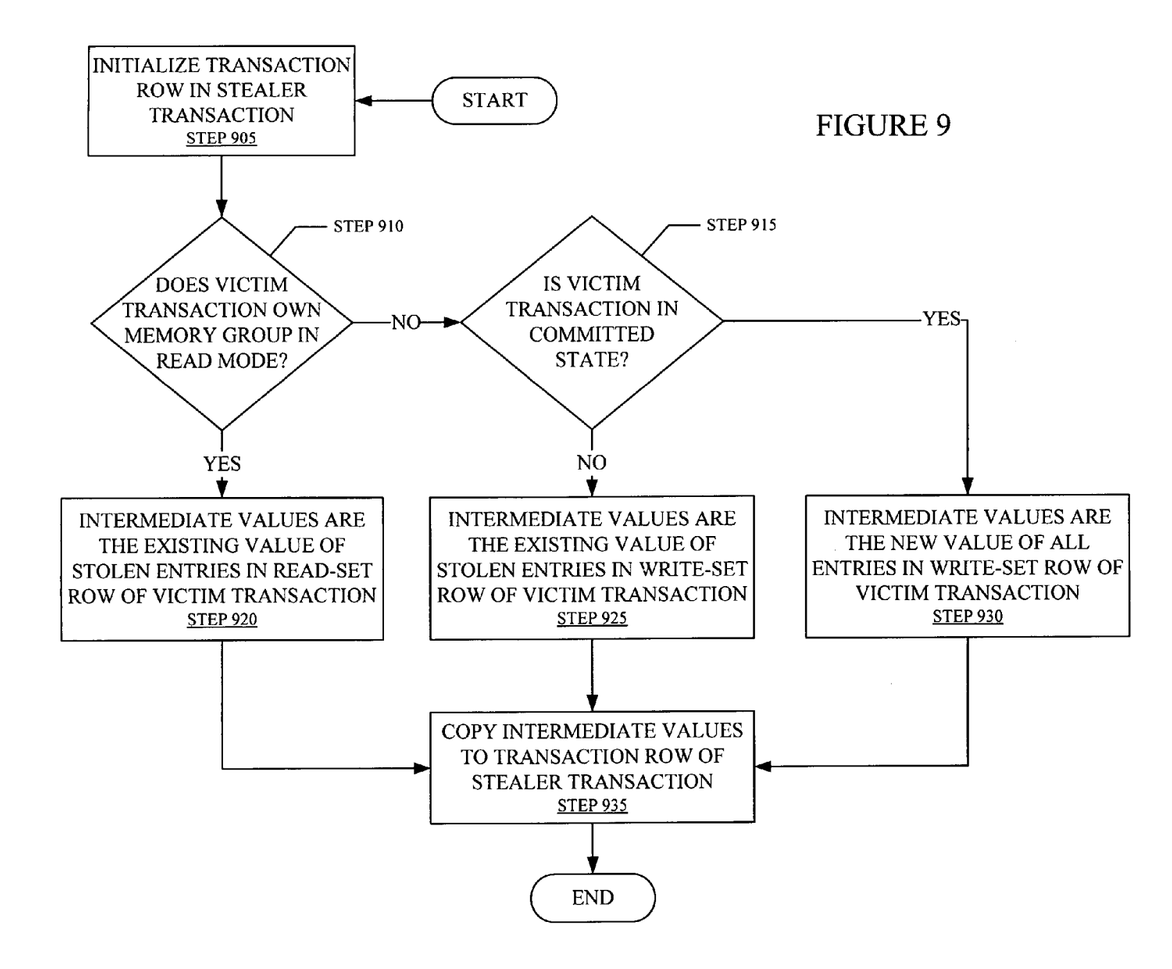

FIG. 9 shows a process for identifying and copying an intermediate value from a victim transaction to a stealer transaction in accordance with one or more embodiments of the invention. In STEP 905, a transaction row may be initialized in the stealer transaction. When the stealer transaction owns the memory group in READ mode, the transaction row may be initialized in the read-set of the stealer transaction. When the stealer transaction owns the memory group in WRITE mode, the transaction row may be initialized in the write-set of the stealer transaction. In one or more embodiments of the invention, initializing a transaction row includes setting the memory identifier field of the transaction row to the memory identifier of the memory group to which the memory location belongs. Initializing the transaction row may also include setting the stolen row flag of the transition row to "true," the transaction committed flag to "false," and the released stolen row flag to "false."

In STEP 910, a determination is made whether the victim transaction owns the memory location in READ mode. When it is determined the victim transaction owns the memory location in READ mode, the process may proceed to STEP 920. When it is determined the victim transaction does not own the memory location in READ mode (e.g., WRITE mode), the process proceeds to STEP 915.

In STEP 920, the intermediate values are defined as the existing values of all entry objects in the victim transaction that (i) have the stolen entry flag set to "true," and (ii) are associated with the memory group to which the memory location belongs. In other words, under the conditions resulting in STEP 920, if an entry object (i) has its stolen entry flag set to true; and (ii) is associated with the memory group to which the memory location belongs, the existing value of said entry object is an intermediate value. Accordingly, if no memory group has been stolen by the victim transaction, no entry object in the victim transaction has been stolen, and thus no value is considered an intermediate value. As the victim transaction owns the memory group in READ mode, all entry objects may be in the read-set of the victim transaction. The memory address field of an entry object may be used to determine whether an entry object is associated with the memory group to which the memory location belongs.

In STEP 915, a determination is made whether the victim transaction is in the COMMITTED state. In one or more embodiments of the invention, a victim transaction is considered in the COMMITTED state when either (i) the victim transaction version matches the transaction version stored in the MOR associated with the memory group and the victim transaction status is set to "COMMITTED", or (ii) the victim transaction version does not match the transaction version stored in the MOR and the transaction row in the victim transaction associated with the memory group has the committed transaction flag set to "true" (discussed above in reference to FIG. 6). When it is determined the victim transaction is in the COMMITTED state, the process proceeds to STEP 930. When it is determined the victim transaction is not in the COMMITTED state (e.g., ACTIVE state, ABORTED state), the process proceeds to STEP 925.

In STEP 925, the intermediate values are defined as the existing values of all entry objects in the victim transaction that (i) have the stolen entry flag set to "true," and (ii) are associated with the memory group to which the memory location belongs. In other words, under the conditions resulting in STEP 925, if an entry object (i) has its stolen entry flag set to true; and (ii) is associated with the memory group to which the memory location belongs, the existing value of said entry object is an intermediate value. Accordingly, if no memory group has been stolen by the victim transaction, no entry object in the victim transaction has been stolen, and thus no value is considered an intermediate value. As the victim transaction owns the memory locations in WRITE mode (STEP 910), all entry objects may be in the write-set of the victim transaction.

In STEP 930, the intermediate values are defined as the new values of all entry objects in the victim transaction that are associated with the memory group to which the memory location belongs. This may include both entry objects that have a stolen entry flag set as "true" and entry objects that have a stolen entry flag set as "false". In other words, under the condition resulting in STEP 930, if an entry object is associated with the memory group to which the memory location belongs, the new value of said entry object is an intermediate value.

When the process reaches STEP 935, the intermediate values of the victim transaction have been identified (STEP 920, STEP 925, or STEP 930). Each intermediate value of the victim transaction is copied to a new entry object in the newly initialized transaction row of the stealer transaction (STEP 905). Further, the new entry objects are flagged as stolen (e.g., Stolen Entry Flag (350) in FIG. 3 is set to "true"). In one or more embodiments of the invention, when the stealer transaction owns the memory location in READ mode, an intermediate value is copied to the existing value (e.g., Existing Value (330) shown in FIG. 3) of the new entry object in the stealer transaction. In one or more embodiments of the invention, when the stealer transaction owns the memory location in WRITE mode, an intermediate value is copied to both the existing value and the new value (e.g., Existing Value (330) and New Value (340) shown in FIG. 3) of the new entry object in the stealer transaction.

In one or more embodiments of the invention, when a transaction (e.g., T1) includes an instruction to read a memory location (i.e., a read instruction), T1 does not acquire ownership of the memory location in READ mode (as discussed above). Instead, the write-set of T1 may first be examined to determine whether T1 has previously stored (i.e., using a write instruction) a value to the memory location. When T1 has previously stored a value to the memory location, the new value of the entry object associated with the memory location is returned. Otherwise, when the memory location is already owned by another transaction (e.g., T2), the intermediate value associated with the memory location is returned, and T2 is aborted (if T2 is active) to prevent T2 from changing the value of the memory location. The returned intermediate value may be stored in the read-set of T1 and used for later validation, which prevents T1 from committing if at least one value read by T1 has changed since it was read. Executing read instructions without owning the memory location associated with the read instruction may be referred to as invisible reads.

Figure 10:
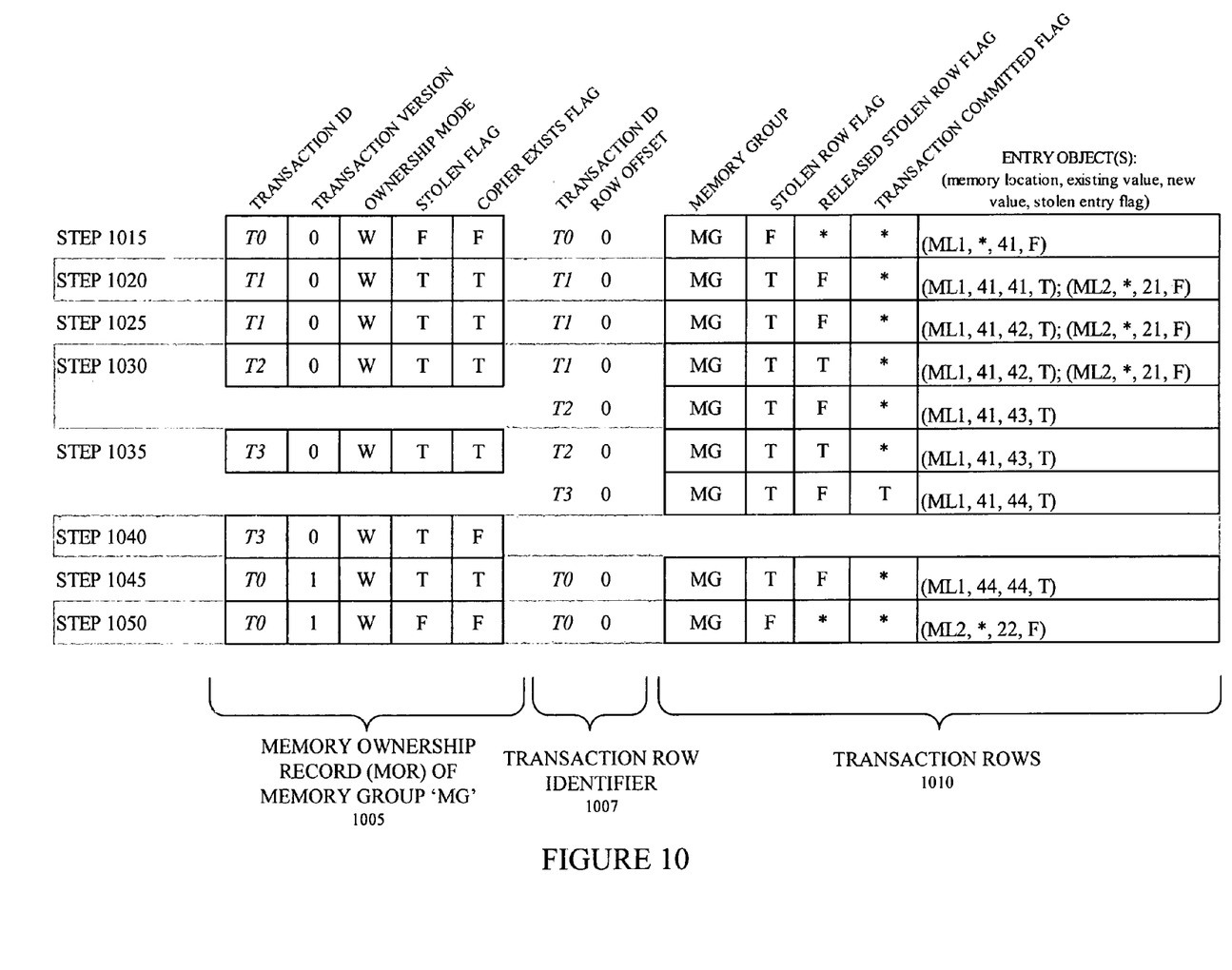
FIG. 10 shows a chart in accordance with one or more embodiments of the invention.

FIG. 10 shows steps (STEPS 1015-1050) taken to execute five example transactions (discussed below) in accordance with one or more embodiments of the invention. As discussed above, a transaction may be uniquely identified using both a transaction ID and a transaction version. Accordingly, in this example, each of the five transactions is identified using the following notation: transaction ID/transaction version. FIG. 10 is based on the example and is not meant to limit the invention in any way.

Let transaction T0/0 include a write instruction for writing the value "41" to memory location ML1. Let transaction T1/0 include write instructions for writing "21" to memory location ML2 and for writing the value "42" to ML1. Let transaction T2/0 include a write instruction for writing the value "43" to ML1. Let transaction T3/0 include a write instruction for writing the value "44" to ML1. Finally, let transaction T0/1 include a write instruction for writing the value "22" to ML2. Assume both ML1 and ML2 belong to the memory group MG and that MG is not owned prior to executing the five transactions.

Each step (STEPS 1015-1050) generates at least one change to the MOR of Memory Group 'MG' (1005). Each step (STEP 1015-1050) may also generate a new transaction row (i.e., Transaction Rows (1010)) or modify an existing transaction row (i.e., Transaction Rows (1010)) in the transaction(s) associated with the step. Each entry object in a transaction row of transaction rows (1010) has the format: (memory location, existing value, new value, stolen entry flag). Further, each entry object in the transaction rows (1010) uses the '*' character to denote a "Don't Care" value. For each transaction row in transaction rows (1010), a transaction row identifier (1007) is provided indicating both the transaction ID associated with the transaction row, and the row offset of the transaction row within the transaction having the mentioned transaction ID.

In STEP 1015, transaction T0/0 acquires ownership of MG as shown in MOR (1005), and adds an entry object to its write-set for writing "41" to ML1 as shown in Transaction Rows (1010). The value "41" is stored in the new value field of the entry object. Transaction T0/0 then commits (i.e., changing its status to COMMITTED) without a copyback of its values.

In STEP 1020, transaction T1/O needs to acquire ownership of MG. However, because MG is owned by transaction T0/0 and transaction T0/0 is committed, transaction T1/0 must steal ownership of MG from transaction T0/0. Transaction T1/0 sets up a stolen row in its write-set and creates a stolen entry object for ML1 as shown in Transaction Rows (1010). T1/0 copies the intermediate value of "41" from transaction T0/0 to both the existing value and new value fields of the stolen entry object. Transaction T1/0 sets both the stolen flag and the copier exists flag of the MG MOR to "true" as shown in MOR (1005). Transaction T1/0 then generates an unstolen entry object to write "21" to ML2. In STEP 1025, transaction T1/0 updates the new value in the entry object for ML1 to "42."

In STEP 1030, transaction T2/0 needs to acquire ownership of MG. However, because MG is owned by transaction T1/0 and transaction T1/0 is still in the ACTIVE state, transaction T2/0 aborts transaction T1/1. Transaction T2/0 then creates a stolen entry object for ML1 in its write-set row. The intermediate value belonging to T1/0 (i.e., "41") is copied to both the existing value field and the new value field of the stolen entry object in T2/0. Transaction T2 steals ownership of MG as shown in MOR (1005), and updates the new value field of the stolen entry object to "43." Finally, transaction T2/0 sets the released stolen row flag of the write-set row associated with transaction T1/0, so that the write-set row of transaction T1/0 may be reused as shown in Transaction Rows (1010).

In STEP 1035, Transaction T3/0 needs to acquire ownership of MG, However, because MG is owned by transaction T2/0 and transaction T2/0 is in the ACTIVE state, transaction T3/0 aborts transaction T2/0. Transaction T3/0 then creates a stolen transaction row in its write-set containing a stolen entry object and copies the intermediate value ("41") to both the existing value and new value fields of the stolen entry object as shown in Transaction Rows (1010). Transaction T3/0 then steals ownership of MG, updates the new value field in the stolen entry object to "44," and then commits. However, Transaction T3/0 does not copyback "44" to ML1 because ML1 is associated with a stolen row and a copier (i.e., transaction T0/0) still exists for MG. Instead, T3/0 sets the transaction committed flag of its own transaction row to "true" as shown in Transaction Rows (1010).

In STEP 1040, transaction T0/0 completes its copyback, storing "41" to ML1. Transaction T0/0 atomically increments its version number and clears the copier exists flag based on the stealer note field as shown in MOR (1005).

In STEP 1045, transaction T0/1 (i.e., reusing transaction ID T0, with version number 1) needs to acquire ownership of MG. However, because MG is owned by transaction T3/0 and transaction T3/0 is in the COMMITTED status, transaction T0/1 must steal ownership of MG. Transaction T0/1 creates a stolen entry in its write-set for ML1 and copies the intermediate value "44" from transaction T3/0 to both the existing value and new value fields of the stolen entry, as shown in Transaction Rows (1010). Those skilled in the art, having the benefit of this detailed description, will appreciate that transaction T3/0 can reuse the transaction row indexed by "0" because this row was released (i.e., released stolen entry row set to "true") in STEP 1030. Further, because the copier exists flag is clear (i.e., "false"), transaction T0/1 can copy values back to all memory locations associated with MG (i.e., ML1 and ML2). Accordingly, Transaction T0/1 sets the copier exists flag to "true" and performs the copyback.

In STEP 1050, transaction T0/1 stores "44" to ML1 and then resets the MG to unstolen. Transaction T0/1 creates an unstolen entry in its write-set row for ML2 with the value "22" in the new value field of the unstolen entry object. Normal, (i.e., unstolen) treatment of the MG can now resume.

Those skilled in the art, having the benefit of this detailed description, will appreciate the copyback process in one or more embodiments of the invention is a non-blocking copyback process. In other words, when a first committed transaction is executing a copyback process, a second transaction requiring ownership of a memory location associated with the copyback process does not need to wait for the first transaction to finish (i.e., the second transaction is not blocked from executing).

Those skilled in the art, having the benefit of this detailed description, will appreciate the use of transaction version numbers allows for a fast release of owned memory groups. In one or more embodiments of the invention, a transaction may quickly relinquish ownership of all memory locations by incrementing the transaction version number.

Those skilled in the art, having the benefit of this detailed description, will appreciate the organization of a write-set into transaction rows, with each transaction row corresponding to a memory group. In one or more embodiments of the invention, once a COMMITTED transaction has copied back the values in a transaction row, ownership of the memory group associated with the transaction row may be immediately released.

Figure 11:
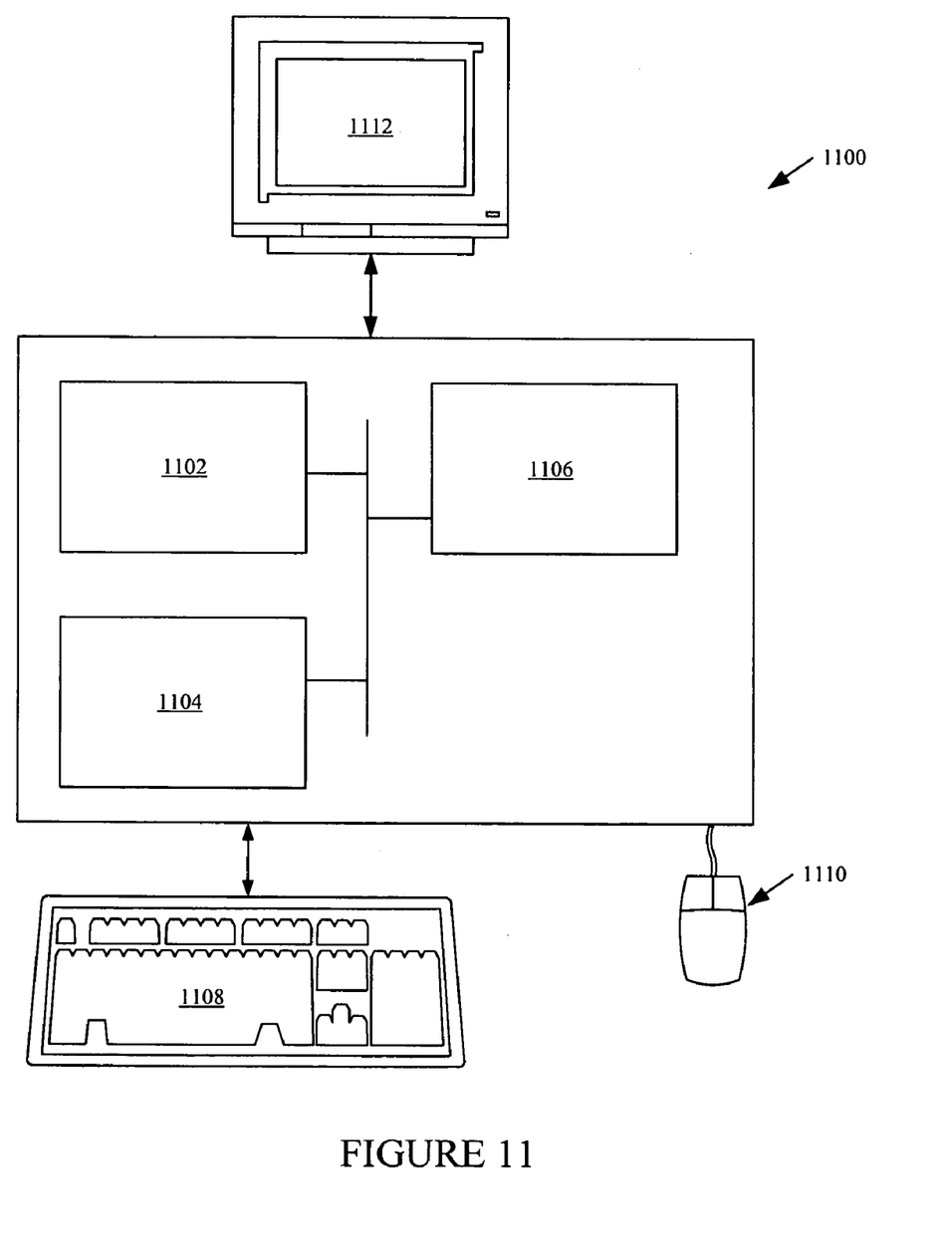
FIG. 11 shows a computer system in accordance with one or more embodiments of the invention.

The invention may be implemented on virtually any type of computer regardless of the platform being used. For example, as shown in FIG. 11, a computer system (1100) includes a processor (1102), associated memory (1104), a storage device (1106), and numerous other elements and functionalities typical of today's computers (not shown). The computer (1100) may also include input means, such as a keyboard (1108) and a mouse (1110), and output means, such as a monitor (1112). The computer system (1100) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (1100) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing transactions comprising:
  obtaining a memory location required by a first transaction, wherein the first transaction is identified using a first transaction identification and a first transaction version;
  determining a second transaction with ownership of a memory group comprising the memory location, wherein the second transaction is identified using a second transaction identification and a second transaction version;
  copying an intermediate value associated with the memory group from the second transaction into transactional metadata associated with the first transaction;
  changing ownership of the memory group to the first transaction; and
  committing the first transaction.

2. The method of claim 1, further comprising:
  aborting the second transaction.

3. The method of claim 1, wherein determining the second transaction comprises:
  accessing a memory ownership data structure.

4. The method of claim 1, wherein the second transaction is both committed and executing a copyback process.

5. The method of claim 4, further comprising:
executing a fast release of the memory group by modifying the second transaction version following the copyback process.

6. The method of claim 4, further comprising:
resetting a flag set by the first transaction.

7. The method of claim 1, wherein copying the intermediate value comprises:
initializing a transaction row; and
setting a flag associated with the transaction row.

8. The method of claim 7, further comprising:
executing a copyback process associated with the intermediate value.

9. The method of claim 1, wherein the transactional metadata is associated with a write-set of the first transaction.

10. The method of claim 1, wherein changing ownership comprises:
performing a compare and swap operation.

11. The method of claim 1, further comprising:
informing the second transaction of the changing ownership.

12. A computer readable medium storing instructions for executing transactions, the instructions comprising functionality to:
obtain a memory location required by a first transaction, wherein the first transaction is identified using a first transaction identification and a first transaction version;
determine a second transaction with ownership of a memory group comprising the memory location, wherein the second transaction is identified using a second transaction identification and a second transaction version;
copy an intermediate value associated with the memory group from the second transaction into transactional metadata associated with the first transaction;
change ownership of the memory group to the first transaction; and
commit the first transaction.

13. The computer readable medium of claim 12, wherein the second transaction is both committed and executing a copyback process.

14. The computer readable medium of claim 13, the instructions further comprising functionality to:
execute a fast release of the memory group by modifying the second transaction version following the copyback process; and
reset a flag set by the first transaction.

15. The computer readable medium of claim 12, wherein the instructions to copy the intermediate value comprise functionality to:
initialize a transaction row; and
set a flag associated with the transaction row.

16. The computer readable medium of claim 12, wherein the instructions further comprise functionality to:
inform the second transaction of the changing ownership.

17. A system for executing transactions comprising:
a first transaction comprising transactional metadata associated with a memory location, wherein the first transaction is identified using a first transaction identification and a first transaction version;
a second transaction owning the memory location and comprising an intermediate value associated with the memory location, wherein the second transaction is identified using a second transaction identification and a second transaction version; and
a memory ownership data structure (MODS) comprising a memory group associated with the memory location, wherein the MODS is modified to change ownership of the memory location to the first transaction prior to committing the first transaction.

18. The system of claim 17, the MODS further comprising a flag, wherein the flag is set by the first transaction and reset by the second transaction.

19. The system of claim 17, wherein the transactional metadata is a transaction row comprising an entry object for storing the intermediate value.

20. The system of claim 17, wherein the second transaction is both committed and executing a copyback process.

* * * * *